FIG: 2.

United States Patent Office 3,450,390
Patented June 17, 1969

3,450,390
MIXING OR KNEADING DEVICE
Constant Johan Nauta, Midden Duin en Daalscheweg 1, Overveen, Netherlands
Filed Nov. 16, 1967, Ser. No. 683,630
Claims priority, application Netherlands, Nov. 23, 1966, 6616525
Int. Cl. B01f 7/08
U.S. Cl. 259—102     7 Claims

ABSTRACT OF THE DISCLOSURE

A device for mixing or kneading granular or paste-like materials having one or more mixing vessels each vessel having a supporting column and one or more mixing members supported by said supporting column the whole system rotating about the axis of the vessel whereas each mixing member rotates about its own longitudinal axis at the same time eventually said mixing members rotating about the axis of the vessel by different paths.

---

This invention relates to a device for mixing or kneading granular or paste-like materials.

A known mixing or kneading device includes one or more mixing vessels, the, or each, vessel having the form of an inverted truncated hollow cone, a supporting column arranged co-axially in the, or each, vessel, the upper end of the column being connected to driving means supported by the vessel. One or more mixing or kneading members is or are arranged in the, or each, vessel, the axis of the, or each, member extending at an acute angle to the axis of symmetry of the vessel, and the upper end of the member being spaced from the vessel axis and being connected to the driving means, the driving means being adapted to rotate the, or each, member about its own longitudinal axis while simultaneously rotating the mixing member about the axis of the vessel. The supporting column has its lower end free and disposed at a distance above the base wall of the vessel. The, or each, member is supported at a location between its upper and lower ends in a bearing arranged on the free end of an arm projecting from the supporting column, this free end lying eccentrically with respect to the axis of the vessel. Not only is this structure rather complicated, but it is difficult to arrange a plurality of mixing members in one mixing vessel such that these members rotate about the axis of the vessel by differing paths.

According to the present invention, there is provided a mixing or kneading device, comprising a vessel in the form of a truncated, inverted, hollow cone, one or more mixing or kneading members arranged in the vessel, the, or each, member having a longitudinal axis extending at an acute angle to the axis of the vessel, driving means arranged to rotate the, or each, member about the axis of the vessel and simultaneously about the member's own axis, and a support extending upwardly in the vessel and having its upper and lower ends mounted at substantially the axis of the vessel and connected at its upper end to said driving means for rotation about the axis of the vessel, the lower end of said support being mounted on the base wall of the vessel by way of a bearing, the, or each, member having its upper end spaced from the axis of the vessel and being connected at its upper end to said driving means, the lower end of the, or each, member being mounted on said support by way of an additional bearing, and the, or each, additional bearing consisting of two elements which are arranged to rotate relatively to each other but which contact each other solely on an annulus which maintains the same position relative to said two elements throughout their relative rotation.

The present device enables a cheaper and yet more reliable mounting of the, or each, member in the vessel to be made. Moreover, the whole structure can be simplified, in particular in respect of the bearing for the lower end of the, or each, member, whilst the support is more firmly mounted in that its lower end is mounted in a bearing.

The support is preferably provided with one or more bends, and/or one or more arms projecting radially away from the longitudinal axis of the vessel towards the vessel side wall, a supporting element forming one of the two elements of the, or each, additional bearing being arranged on the, or each, bend or arm, the bearing on the, or each, bend being disposed on the axis of the vessel, and/or the bearing on the, or each, arm being disposed eccentrically with respect to the axis of the vessel.

Furthermore, even when the upper ends of a plurality of such mixing or kneading members are equidistantly spaced from the axis of the vessel, the members can be arranged so that they rotate about the axis of the vessel by differing paths. This can be obtained by disposing the additional bearing either so that they are spaced differently from the axis of the vessel, or that they are situated equidistantly from the vessel axis but at different heights from the base wall of the vessel. Alternatively, it is possible to space bearings for the upper ends of the members differently from the axis of the vessel, so that the members rotate about the axis of the vessel by differing paths even when the lower bearings of the members are arranged at the same level and are equidistantly spaced from the vessel axis.

For a better understanding of the invention and to show how the same may be carried into effect, reference will now be made, by way of example, to the accompanying drawings, in which.

Figure 1:
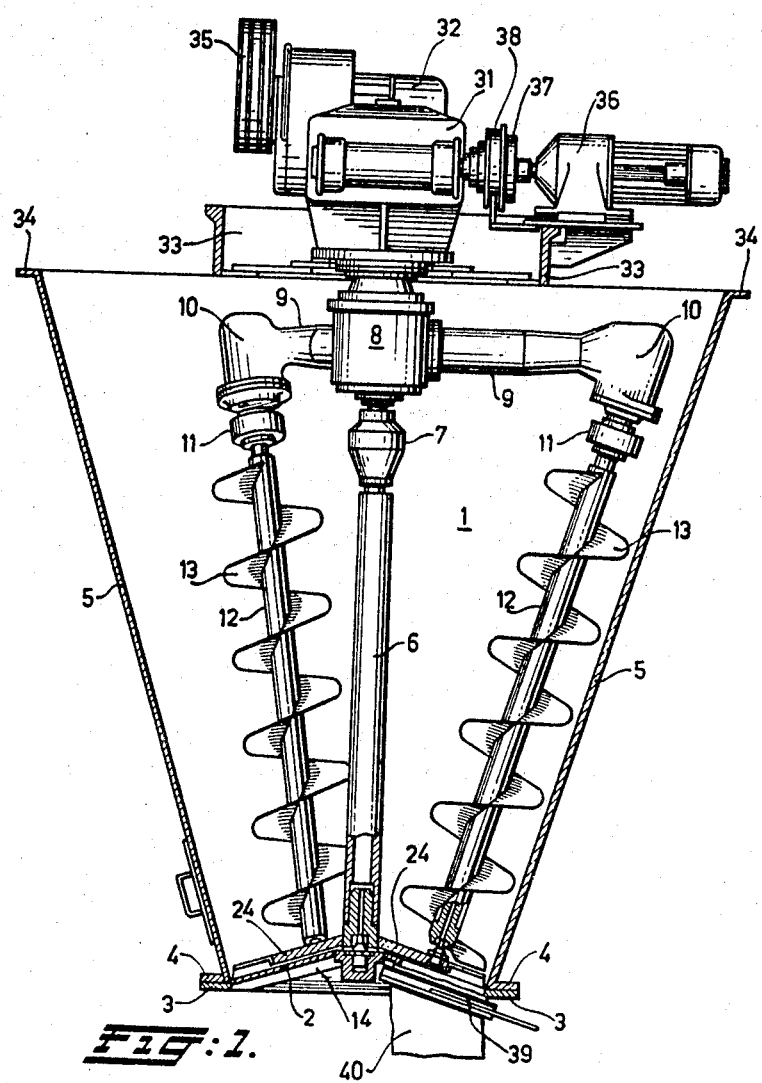
FIGURE 1 is a vertical axial section through a device for mixing or kneading granular or paste-like materials.
Figure 2:
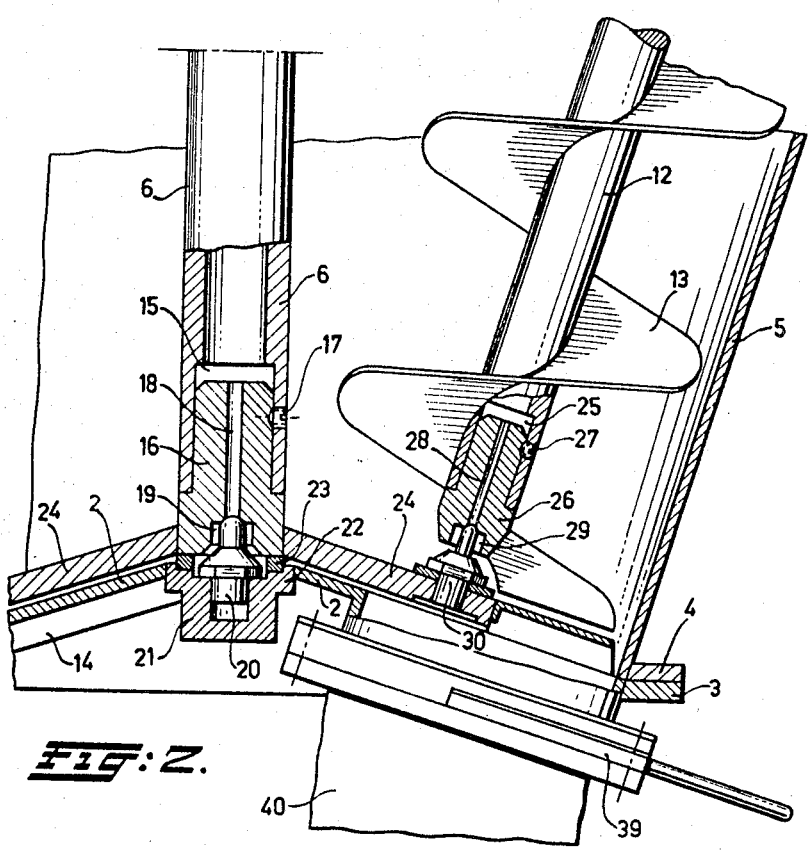
FIGURE 2 is a detail of FIGURE 1.

Referring to FIGURES 1 and 2, the device includes a vessel 1 which is generally in the form of an inverted, truncated, hollow cone, the vessel having a conical base wall 2. By means of a peripheral flange 3 the wall 2 is secured to a peripheral flange 4 at the lower edge of the side wall 5 of the vessel 1. A hollow supporting column 6 is arranged in the vessel 1. By means of a coupling element 7 the upper end of the column 6 is connected to a hollow central head 8 of a driving system, the head 8 having connected thereto the inner end of three hollow drive arms 9. These arms 9 extend radially in the vessel 1 at mutual angles of 120°, only two arms 9 being shown in FIGURE 1. The arms 9 have heads 10 in which bear, by way of coupling elements 11, the upper ends of shafts 12 of three mixing or kneading screws 13.

The lower end of the column 6 is mounted by way of a bearing, on the base wall 2, which is stiffened by means of ribs 14 (see also FIGURE 2). The lower end of the hollow column 6 is provided with a bore 15 slightly wider than the interior of the column. A supporting spindle 16 slid into this bore 15 is fixed therein by means of a locking element 17. The spindle 16 is provided with a bore 18 debouching at its lower end into a cup-shaped recess 19 much wider than the bore 18. The bearing for the supporting column 6 includes a pin 20 secured in a supporting cup 21 mounted in the base wall 2. The pin 20 has a spherical head so that the shoulder between the bore 18 and the recess 19 contacts this pin on only a single annulus, the shoulder and the pin forming the two elements of the bearing. A packing 23 is interposed between the peripheral edge 22 of the cup 21 and the lowermost face of the spindle 16, so that the material mixed or kneaded in the vessel 1 cannot penetrate into this bearing.

Associated with each screw 13 is a supporting arm 24 fixed to the column 6 and arranged in a common vertical plane with the drive arm 9 of the associated screw 13, the arm 24 extending from the spindle 16 towards the wall 5. Each screw is supported at its lower end by means of a bearing of the kind described for the column 6. The shaft 12 is hollow and is provided at its lower end with a bore 25 slightly wider than the interior of the hollow shaft. A supporting spindle 26 slid into this bore 25 is fixed therein by means of a locking element 27. The spindle 26 is provided with a longitudinal bore 28 debouching at its lower end into a cup-shaped recess 29. A pin 30 is fixed to the associated supporting arm 24 and has a spherical head so that the shoulder between the bore 28 and the recess 29 contacts the pin 30 on only a single annulus.

By means of driving mechanism known per se having parts accommodated in the hollow central head 88 and the hollow arms 9, the shafts of the screws 13 are rotated about their own axes. Moreover, the central head 8 is connected at its upper end to a gear box 31. Both the gear box 31 and an electric motor 32 are supported by a common beam-like bridge 33 crossing the mixing or kneading space of the vessel 1 and supported by a periphery flange 34 at the upper edge of the wall 5. The driving mechanism also comprises pulleys and belts 35 connected to the input side of the gear box 31 and driven by the motor 32, whereby the motor 32 rotates the screws 13 about their axes. An electric motor and reduction gear 36 drives, via a coupling 37 and a switch 38, the central head 8 together with the arms 9, the column 6 and the supporting arms 24, and consequently the screws 13 are rotated about the axis of the vessel, but at an angular velocity much less thna that at which each screw 13 is rotated about its own axis.

The kind of bearing at the lower ends of the screws 13 and of the column 6 particularly contributes towards making the mixing or kneading device a simple, but reliable, structure. Moreover, in each bearing the pin and the spindle are always co-axial, so that the annular line of contact maintains the same position relative to the pin and the spindle throughout rotation of the spindle on the pin. This arrangement furthers smooth rotation of the screw about its own axis and at the same time prevents to a great extent the wear of the bearing at the lower end of the screw, which wear results finally in an unacceptable clearance in the bearing. Such wear would occur if the spindle were to be arranged to precess about the pin.

In the base wall 2 of the vessel 1 means 39 are arranged to enable pouring of the product obtained by the mixing or kneading from the vessel 1 into for instance a bag 40.

Figure 3:
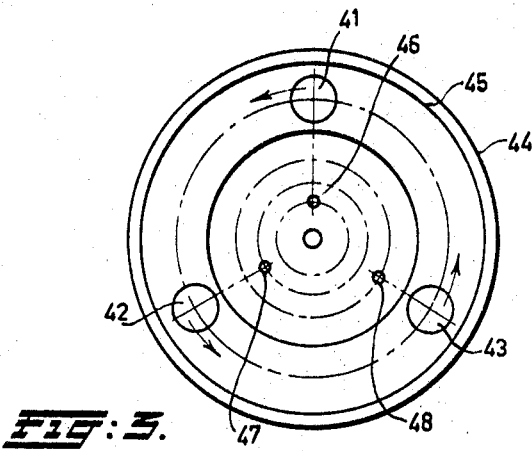
FIGURES 3 and 4 are diagrammatic plan views of modified versions of the device.

Although it is possible to arrange only one screw in the mixing vessel, a plurality of screws are preferably arranged in the vessel, in which case the screws advantageously rotate about the axis of the vessel by differing paths. For instance, there is shown in FIGURE 3 a version in which the heads 41, 42 and 43 of three drive arms connected to respective screws rotate by a common circular path about the axis of the vessel 45, the side wall of which has an upper peripheral flange 44. However, bearings 46, 47 and 48 at the lower ends of the screws rotate in circles about the vessel axis at differing radial distances and consequently the screws are at differing acute angles to the vessel axis, so that the members rotate about that axis by respective differing paths. In many processes, this improves the mixing results.

Figure 4:
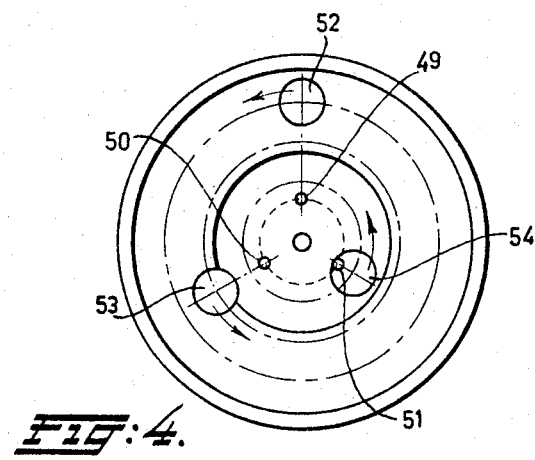
Figure 5:
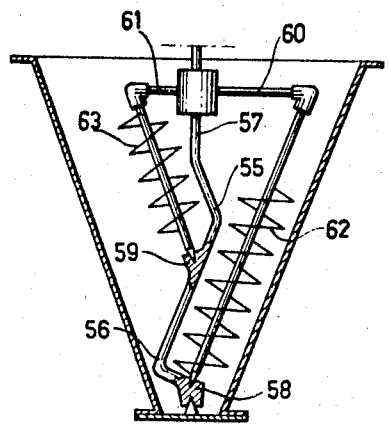
FIGURES 5 and 6 are diagrammatic vertical axial sections through other modified versions of the device.

In FIGURE 4 a similar effect as in FIGURE 3 is obtained, except that the bearings 49, 50 and 51 supporting the lower ends of the screws rotate about the axis of the vessel by a common circular path, whereas the heads 52, 53 and 54 of the drive arms rotate about Moreover it is possible to obtain supporting faces for these bearings at the lower ends of the screws by providing for instance two bends 55 and 56 in the supporting column 57 (see FIGURE 5). The bearings 58 and 59 are situated substantially on the vessel axis. Owing to the inclination of each supporting face, the pin and the spindle forming the bearing supported by the face can be arranged to remain coaxial. The bearings 58 and 59 are situated at differing heights from the base wall of the vessel, this difference in height, together with a difference in length of the drive arms 60 and 61, having the effect that the two screws 62 and 63 rotate about the axis of the vessel by differing paths.

Figure 6:
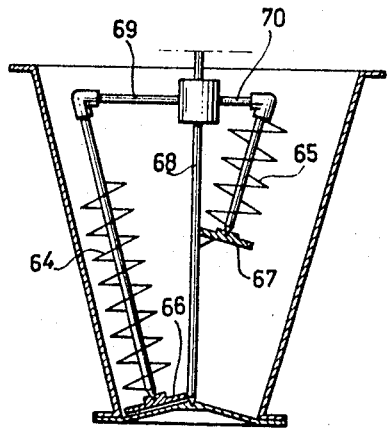

In FIGURE 6 a similar effect is obtained as in FIGURE 5, but now the bearings at the lower ends of the screws 64 and 65 are arranged on supporting arms 66 and 67, respectively, fixed at differing heights from the base wall of the vessel on a straight supporting column 68, the drive arms 69 and 70 again having differing lengths.

The invention can also be applied to mixing or kneading devices each provided with a plurality of vessels which for instance can intercommunicate at their upper parts about a portion of the circumference of each vessel, so that the upper part of each mixing or kneading member arranged in each vessel can penetrate temporarily into the, or each, adjacent vessel.

What I claim is:

1. A device for treating a substance as by mixing or kneading, comprising a vessel in the form a truncated, inverted, hollow cone, a treating member arranged in the vessel and having a longitudinal axis extending at an acute angle to the axis of said vessel, driving means arranged to rotate said member about the axis of said vessel and simultaneously about the member's own axis, and a support extending upwardly in the vessel and having its upper and lower ends mounted substantially on the axis of the vessel and connected at its upper end to said driving means for rotation about the axis of the vessel, the lower end of said support being rotatably mounted on the base wall of the vessel said member having its upper end spaced from the axis of the vessel and being connected at its upper end to said driving means, the lower end of said member being mounted on said support by a bearing.

2. A device as claimed in claim 1, wherein said support is formed with a bend along its length, the lower end of the member being mounted via the bearing on the bend.

3. A device as claimed in claim 2, wherein said bearing is positioned substantially on the axis of the vessel.

4. A device as claimed in claim 1, wherein said support includes one arm projecting away from the axis of the vessel towards the side wall of the vessel, the lower end of the members being mounted via the bearing on the arm, and the bearing being disposed eccentrically with respect to the axis of the vessel.

5. A device as claimed in claim 4, wherein there is a plurality of such treatment members, and wherein the bearings are disposed eccentrically with respect to the axis of the vessel to differing extents.

6. A device as claimed in claim 1, wherein there is a plurality of treatment members, and wherein the bearings are disposed at different heights from said base wall.

7. A device as claimed in claim 1, wherein there is a plurality of such treatment members, and wherein the upper ends of the members are mounted at differing distances from the axis of the vessel.

References Cited

UNITED STATES PATENTS

| 2,831,663 | 4/1958 | Nauta | 259—102 |
|---|---|---|---|
| 3,109,633 | 11/1963 | Nauta | 259—102 |

FOREIGN PATENTS

| 1,239,864 | 7/1960 | France. |
|---|---|---|

ROBERT W. JENKINS, *Primary Examiner.*